United States Patent [19]

Hull et al.

[11] 4,114,048
[45] Sep. 12, 1978

[54] LOAD BALANCING SYSTEM FOR UPS RECTIFIERS

[75] Inventors: Robert E. Hull; Robert S. Gemp, both of Amherst, N.Y.

[73] Assignee: Westinghouse Electric Corp., Pittsburgh, Pa.

[21] Appl. No.: 816,556

[22] Filed: Jul. 18, 1977

Related U.S. Application Data

[63] Continuation of Ser. No. 665,600, Mar. 10, 1976, abandoned.

[51] Int. Cl.$^2$ .............................................. H02J 3/38
[52] U.S. Cl. ....................................... 307/53; 307/66
[58] Field of Search ............... 307/48, 44, 53, 51, 307/69, 54, 57, 23, 24, 66, 82, 55, 58; 363/37, 129, 130, 71, 82

[56] References Cited

U.S. PATENT DOCUMENTS

| | | | |
|---|---|---|---|
| 3,014,171 | 12/1961 | Cham et al. ............................. | 363/82 |
| 3,621,365 | 11/1971 | Beck ...................................... | 307/58 |
| 3,864,620 | 2/1975 | Abbondanti ........................... | 363/71 |
| 3,956,638 | 5/1976 | Ahrens et al. ......................... | 307/48 |

*Primary Examiner*—Robert K. Schaffer
*Assistant Examiner*—Morris Ginsburg
*Attorney, Agent, or Firm*—C. M. Lorin

[57] ABSTRACT

In order to maintain a balanced load between power rectifiers operating in parallel within an uninterruptible power system, individual closed loops are established for regulating the direct current voltage at the output of the rectifiers and an open loop generates a reference voltage for each of such regulations. An operational amplifier is used as a current source to develop a current representative of the load in a particular rectifier. Parallel current dissipating resistors between each rectifier line and a floating potential common to all rectifier lines generates a reference voltage which is proportional to the average of such current dissipations and represents the average rectifier load.

3 Claims, 2 Drawing Figures

LOAD BALANCING SYSTEM FOR UPS RECTIFIERS

This is a continuation of application Ser. No. 655,600 filed Mar. 10, 1976, now abandoned.

BACKGROUND OF THE INVENTION

The invention relates to static power systems in general, and more particularly to uninterruptible power systems (U.P.S.) such as used on aircraft, for computer systems, or wherever a source of proper nature, voltage and/or frequency is not directly available and when continuity of service is essential.

An uninterruptible power system (U.P.S.) generally uses the assist of a battery which will, or automatically can, be switched in parallel with a direct current power supply obtained by conversion from the network through a rectifier arrangement, in case the latter would fail. The direct current power is then converted by inverter to alternating current supplied to the user's load. Typical of a system for the generation of alternating current by inverter is the apparatus disclosed in U.S. Pat. No. 3,491,282 of T. M. Heinrich et al in which is described a static inverter system generating a sinusoidal wave of improved quality and which is voltage controlled.

Fully-redundant UPS systems are used for the most stringent demands of service continuity to a critical load, or for large installations on the order of 500 KVA and larger. It is anticipated that even the most reliable inverter (or other part of the UPS system) will experience failure eventually, and that the system performance must be protected from that kind of failure. By operating inverters in parallel with one more unit than is necessary for load requirements, it is possible to remove a malfunctioning unit without upsetting the critical load. Also, any one unit can be removed from operation for servicing, inspection, or testing, whithout reducing the system capacity. With larger rated systems, above 250 KVA for example, inverters must be paralleled to achieve the desired capacity. As a result a greater number of components are involved, and the inverter reliability may be statistically reduced. The use of redundancy will more than compensate for this drawback, and at lesser expense with larger systems.

An object of the present invention is to provide balanced load sharing between parallel channels each including static controlled rectifiers for supplying direct current to inverters feeding a common load.

Another object of the present invention is to provide an uninterruptible power system having inherently balanced load sharing between parallel and redundant channels.

SUMMARY OF THE INVENTION

Rectifiers in parallel do not inherently share load current equally. The invention provides for automatic load balancing between the rectifiers to insure proper operation, and prevent overload. The invention is applicable to the parallel rectifiers of redundant uninterruptible power systems. The voltage regulator of each rectifier is controlled by an error signal representing the deviation from equal sharing of the load. The direct current flowing at the output of one rectifier is sensed from a shunt in order to provide an indication of the current load therein, and each of the currents flowing in similar sensing circuits of the respective rectifiers is made to flow, through a resistance connected in parallel with the other resistances, toward a common reference potential so as to generate across the resistances a voltage which is characteristic of the average of all such flowing currents. The error signal to be used for correction in any rectifier output is derived from a comparison of the individual current load with such characteristic voltage.

DESCRIPTION OF THE PREFERRED EMBODIMENT OF THE INVENTION

Figure 1:
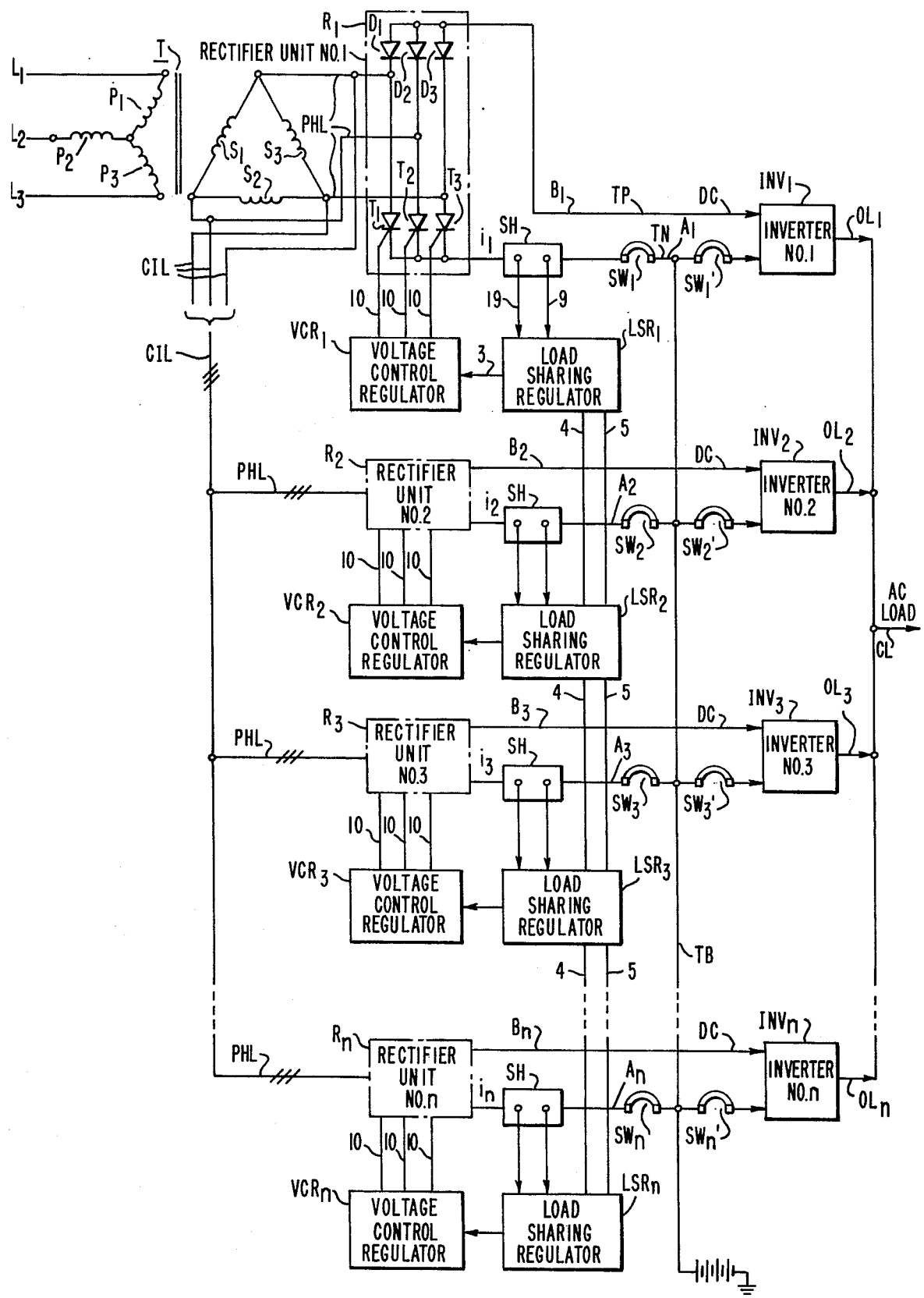
FIG. 1 illustrates the invention as applied to an uninterruptible power system.

Referring to FIG. 1 a plurality of rectifier units $R_1$-$R_n$ are shown supplied in parallel from a common three-phase alternating current power supply including a star-todelta transformer T. Common input lines CIL are derived from the delta secondary windings $S_1$, $S_2$, $S_3$. Each rectifier unit, in a typical example, includes three thyristor devices $T_1$, $T_2$, $T_3$, respectively connected on phase lines PHL between two direct current terminals TP, TN and mounted in series with respective diodes $D_1$, $D_2$, $D_3$. Although any other rectifier units can be used, in parallel as shown, the one shown schematically for rectifier unit $R_1$ preferably is of the model S-300 manufactured by Westinghouse Corporation. The rating of such power rectifiers may vary from 25 kW to 250 kW depending on the particular application. The voltage developed between TP and TN in a typical situation may be set between 250 volts and 350 volts when operating without constant current. A 50 mv shunt SH is inserted in the TN line of each rectifier. The thyristor devices are controlled by a voltage control regulator, $VCR_1$ -$VCR_n$ for the respective rectifier units, which, as generally known, establishes a desired firing angle in the static device so as to regulate the output voltage.

FIG. 1 typically shows an uninterruptible power system (UPS), e.g., several direct current sources ($R_1$-$R_n$) are mounted in parallel for redundancy and increased capacity, and emergency batteries are provided ready to be switched into operation when necessary. Switch breakers $SW_1$, $SW_1'$,-$SW_n$, $SW_n'$ are included in each channel for disconnecting any rectifier unit from operation or for applying voltage from or to the batteries. The rectifier units may serve at times as rectifier-charges for the batteries.

In each channel, inverter units $INV_1$,-$INV_n$ respectively, are supplied with direct current from terminals TP, TN for generating on the output lines $OL_1$,-$OL_n$, alternating current power to a common load. The inverter units $INV_1$,-$INV_n$ typically are such as described in the aforementioned Heinrich patent. Such as UPS system is generally used for loads requiring continuity of service and powers as high as 500 KVA, or more. Computers, data loggers, medical instrumentation, aircraft, are typical of loads requiring an UPS system.

Figure 2:
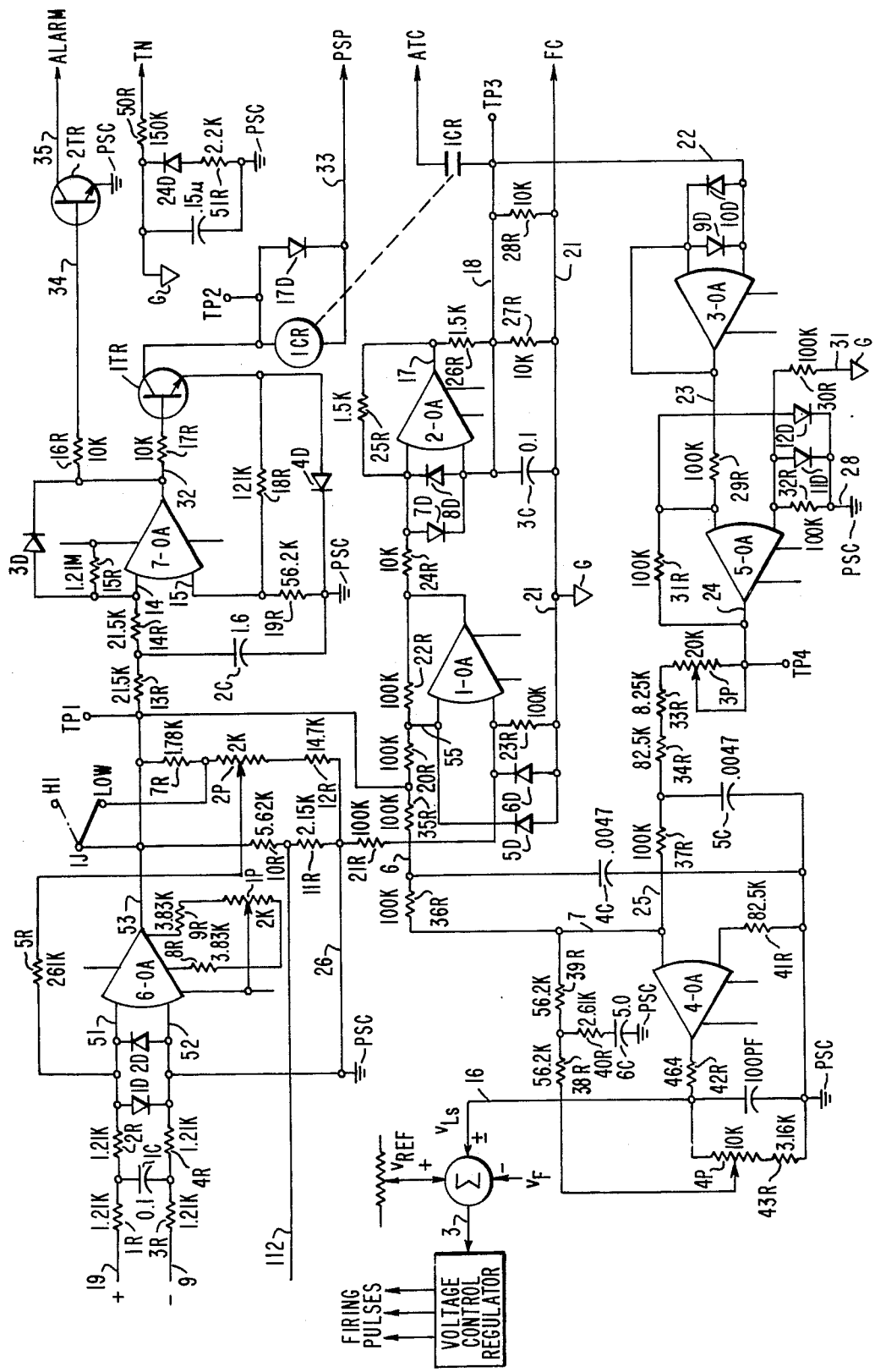
FIG. 2 shows a printed circuit board with the circuitry associated with the voltage regulator of one particular rectifier in the system of FIG. 1.

In order to maintain a constant voltage the voltage control regulators of the rectifier unit and the associated inverter unit are automatically adjusted. Nevertheless, with parallel links such as shown in FIG. 1 the load between rectifier units $R_1$-$R_n$ is not inherently balanced. In order to provide a substantially equal sharing of the load between the rectifier units, the present invention proposes to add load sharing regulator $LSR_1$-$LSR_n$ to the system. In FIG. 2 one of such load sharing regulators is shown in detail.

The output current of each rectifier unit is monitored at the output shunt SH. The load sharing regulator produces a small signal proportional to the current in the shunt. The signal currents from all load sharing regulators are summed and the average signal current is determined between lines FC and ATC which are common to all load sharing regulators. Each individual signal current is compared to the average and an error signal is produced, on lines 16 of the respective rectifier units, which is used as an input to the associated voltage control regulator $VCR_1$-$VCR_n$ to correct the output voltage between lines TP, TN of the corresponding rectifier unit. In this manner, any deviation from the average current is automatically corrected.

Referring to FIG. 2, a printed circuit board is shown in which the signal received on respective lines 9, 19, from shunt SH is amplified by operational amplifier 6-OA.

Rectifiers $R_1$-$R_n$ have a control circuit ground PSC electrically connected to the positive output of the rectifier TP, but not tied to earth ground. For this reason precautionary measures must be taken regarding isolation in the printed circuit board. The only earth ground in the whole system is provided at the side of the a.c. load for safety reasons. In normal operation with all rectifiers connected to the battery bus, all TP positive outputs are connected together and therefor all PSC control system grounds are connected together. Should one rectifier be disconnected from the battery bus, the TP output of the rectifier also becomes disconnected from the TP outputs of the other rectifiers in the system. Thus, the PSC of this particular rectifier is no longer connected to the PSC of the other rectifiers in the system.

The gain of operational amplifier 6-OA is adjustable from 108 to 135 in two ranges by potentiometer 2P. A feedback signal is derived on line 112 for use in IR compensation and current limit operation through the voltage control regulator. The gain is adjusted so that the voltage at $TP_1$ is (−) 4.07 volts when the rectifier unit is putting out full load current. Potentiometer 1P is provided to minimize output offset voltage at $TP_1$.

The output signal on line 53 from operational amplifier 6-OA is supplied along a path comprising lines 4, 6 and 7, and is applied as an input to an error amplifier 4-OA. From line 4 the output signal is supplied as an input signal to amplifier 1-OA which is mounted as a unity gain differential amplifier. A second amplifier 2-OA is used behind operational amplifier 1-OA as a voltage controlled current source. These amplifiers are mounted between input line 1 and line 21 which is itself connected by FC to the closest printed circuit board so as to form a common link with all printed circuit boards. Line FC has a floating potential. Contacts 1CR of a relay 1CR are provided to establish a connection between lines 17, 19 and another link ATC common to all the printed circuit boards. When this occurs, amplifier 2-OA produces on line 17 an output current flowing through load resistors 27R, 28R that is proportional to its input voltage, and this current is also proportional to the current flowing into shunt SH. When relay contact 1CR is closed, the current flowing through resistors 27R and 28R is in parallel with similar currents flowing at the same point in the other load sharing boards. Therefore, the voltage at TP3 is proportional to the average of all such currents e.g. the average load current.

Amplifier 3-OA is interposed between TP3 and input of amplifier 5-OA and is connected as a high input impedance unity follower to prevent loading on the floating line FC. The parallel currents in the printed circuit boards are flowing from the common link ATC to the common link FC. These two links do not have any other electrical connection than as shown, thus, they are not fixed to any ground point, so that a potential is established therebetween which is equal to the average of the currents flowing in all the shunts SH of the operative rectifier units $R_1$-$R_n$.

This average voltage on each printed circuit board is applied to the combination of amplifiers 3-OA and 5-OA by a process inverse from the one building a potential at the output of amplifiers 1-OA, 2-OA. Thus, on line 22 the voltage of point TP3 is inputted to unity gain follower amplifier 3-OA. Differential amplifier 5-OA mounted between the PSC of the amplifier and the common floating potential of line 21 generates from the inputted signal on line 23 a signal representing the average current derived at TP3. This signal is then summed with the signal on line 7 at the input of an error amplifier 4-OA to generate an error signal $v_{Ls}$ on line 16. Signal $v_{Ls}$ is applied to the load sharing regulator for providing an automatic compensation for any deviation in the current sensed between lines 9, 10 from the average current load in the system of voltage sources $R_1$-$R_n$.

A potentiometer 3P is provided in order to adjust for unity gain through the loop comprising operational amplifiers 1-OA, 2-OA, 3-OA, 5-OA. Another potentiometer 4P is provided in order to adjust the load sharing regulator gain. The latter should be set for the minimum gain giving reliable load balancing throughout the range of loads. As earlier stated, differential amplifiers 1-OA and 5-OA are provided to isolate the individual polarity sources PSC from the floating line FC. This isolation is necessary in the event of semiconverter failure in order to ensure the correct load sharing of the remainder of the semiconverters $R_1$-$R_n$ in the system. It appears that one half of the load sharing circuit, that is 6-OA, 4-OA and 5-OA, is powered by a power supply referenced to PSC. The other half, that is 2-OA, 1-OA and 3-OA is powered by a floating power supply ground G referenced to the FC line.

When a rectifier is disconnected, the PSC ground can shift voltage with respect to the FC line by an unknown amount. The isolation amplifiers are provided to isolate via common mode isolation the effects of small changes in ground potentials between PSC and G and to limit and protect the circuitry in the event of large changes between PSC and G. Diodes 11D, 12D and 5D, 6D are provided to clamp large common mode voltages for circuit protection in event of a large shift. Also the PSC potential and the G potential are normally connected to a forward biased diode 24D keeping them typically within 4 volts of each other. The TN terminal is the negative output of the rectifier at approximately minus 300 volts, and this is the forcing signal used to forward bias the diode 24D. Thus PSC and G are kept within 4 volts of each other, which is with the common mode rejection tolerance of amplifiers 5-OA and 1-OA. Should PSC drift off to a large negative voltage with respect to G, as could happen when a switch breaker is opened, the diode 24D would reverse bias and disconnect PSC from G and allow PSC to swing to its own potential. This further isolates the two grounds. Shunt amplifier 6-OA also provides a current feedback signal, which is taken out of terminal 112 and used by the voltage regulator, for current limit and IR compensation.

An alarm function for startup of a last one rectifier into an operating system of other rectifiers is provided, since load sharing is not desired until the last rectifier is delivering current. The circuit 7-OA determines when the last rectifier is delivering greater than about 14% load current. Each rectifier has a rated 100% load current, and the gain of the shunt amplifier 6-OA can be adjusted to calibrate the switching of 7-OA so the latter switches at approximately 14% load of the associated rectifier. The switch 7-OA and associated transistor 1TR control the relay 1CR which then connects a given rectifier to the load sharing tie bus. The rectifiers have a ramp up circuit operative when the input a.c. breaker is closed so the output d.c. voltage will ramp slowly. It is not desired to load share until this output voltage has reached system voltage. Otherwise the other rectifiers in system would attempt to load share with a rectifier that is not putting out any current at all and this would reduce system output.

Aforementioned contacts 1CR joining lines 18 and ATC belong to a relay 1CR which normally is energized from line 33 either permanently or manually, when the printed circuit board is to control an operative rectifier unit. When the rectifier unit is out of operation, relay 1CR is deenergized and line 18 is disconnected from the common line ATC.

The energizing circuit of relay 1-CR is in circuit with transistor 1TR. Conduction of the latter is controlled from the output of a comparator 7-OA. Comparator 7-OA operates as a limit switch, in response to the signal on line 3 and line 14, in order to establish a critical limit beyond which the printed circuit board is automatically disconnected from the others by relaxation of relay 1CR. If the gain of the shunt amplifier 6-OA has been properly set so that the voltage at TP1 is (−) 4.07 VDC at full load, then relay 1CR will automatically close at 14±2% load, and open at 9 ± 2% load. Relay 1CR connects or disconnects the load sharing regulator board from line ATC.

Thus, in order to enable load sharing for one rectifier unit, the current in the shunt SH must be in excess of 14% load current.

Terminal 35 and the circuit including transistor 2TR can be used to control an alarm relay that opens when the output current drops below 9% of full load.

We claim:

1. A system for supplying a load with alternating current from a plurality of adjustable direct current voltage sources with said plurality of voltage sources including a like plurality of rectifier means supplied with alternating current from a power supply common to all voltage sources for generating a corresponding direct current voltage and the system further including a like plurality of inverter means each associated with one of said rectifier means for supplying a corresponding alternating current to said load, comprising:
   means associated with one of said voltage sources for sensing direct current supplied therefrom and for deriving a signal representative of said supplied direct current;
   means associated with each of said voltage sources for deriving a reference signal representative of the average of the direct currents flowing from all of said sources;
   means responsive to said current representative signal and to said reference signal for generating an error signal representative of a discrepancy between said current representative signal and said reference signal; and
   means responsive to said error signal for adjusting the direct current voltage of said one source to compensate for said discrepancy.

2. In a system for supplying direct current to a load from a plurality of adjustable DC voltage sources, the combination:
   of a network of parallel resistors, with each resistor being associated with a different one of said voltage sources and coupled between common first and second electrical connections, and of individual control circuits each connected between a different voltage source and a corresponding resistor of said network, wherein each of said control circuits comprises:
   (a) first isolating means;
   (b) current sensing means for providing a first signal representative of the current supplied to the load by the associated voltage source;
   (c) means connected after said first isolating means and responsive to said current sensing means for providing through said resistor network a first individual current in proportionate amount to said representative signal to establish between said first and second connections with all similar first individual currents in other control circuits a voltage representing the average of all said first individual currents;
   (d) a second isolating means;
   (e) means connected to the resistor associated with that control circuit for providing through said second isolating means a second individual current in relation to said average voltage; and
   (f) means responsive to said second individual current after said second isolating means and to said first representative signal for adjusting the voltage of the associated voltage source to compensate for any difference error between said first representative signal and said second individual current.

3. The system of claim 2 comprising means for disconnecting a selected voltage source from said load and for concurrently disconnecting the associated individual control circuit from one of said first and second electrical connections.

* * * * *